No. 825,654. PATENTED JULY 10, 1906.
J. H. JESSEN.
FERTILIZER SPREADER.
APPLICATION FILED APR. 24, 1905.
3 SHEETS—SHEET 2.
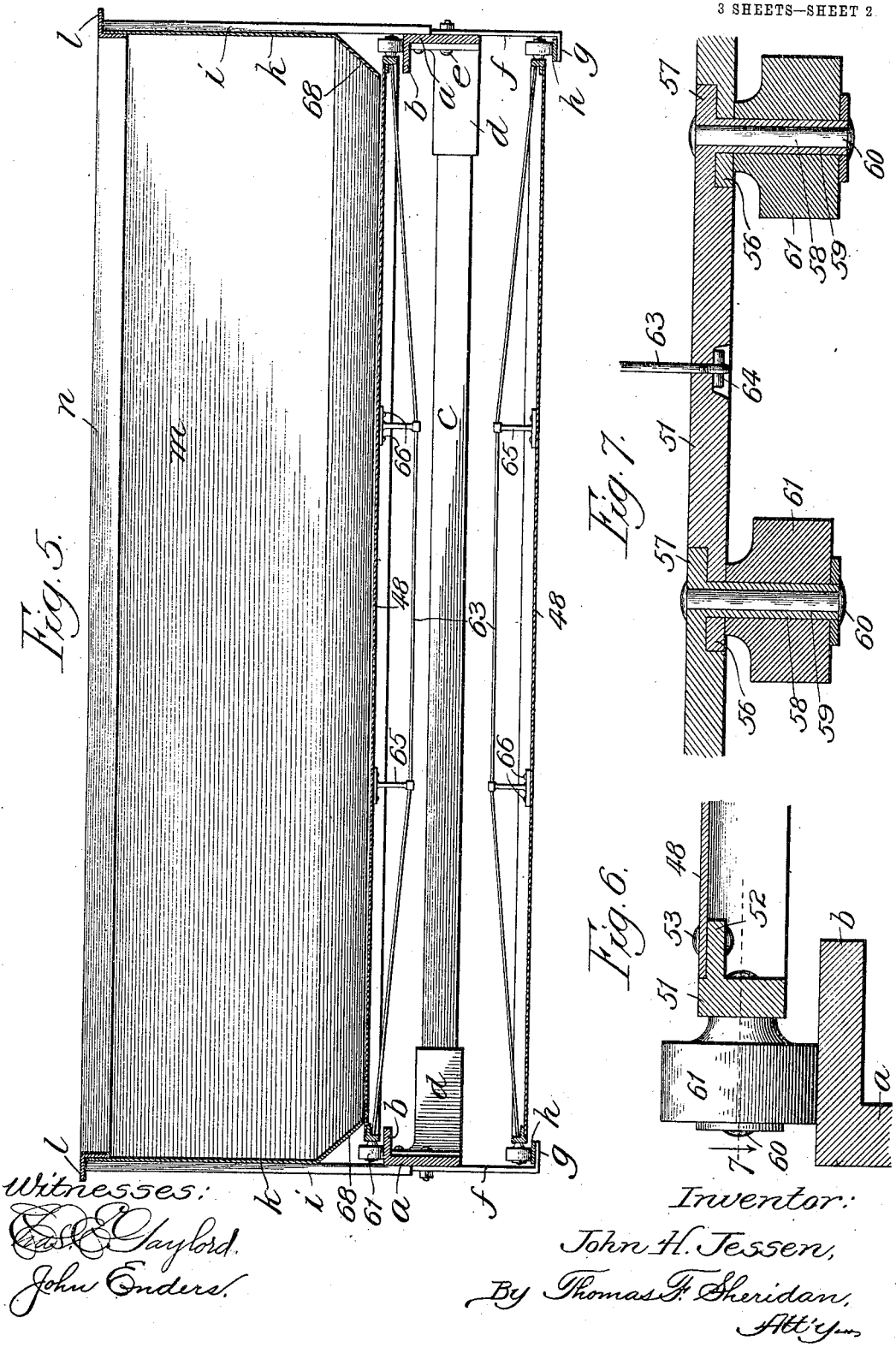
Witnesses:
C. E. Gaylord
John Enders
Inventor:
John H. Jessen,
By Thomas F. Sheridan,
Att'y

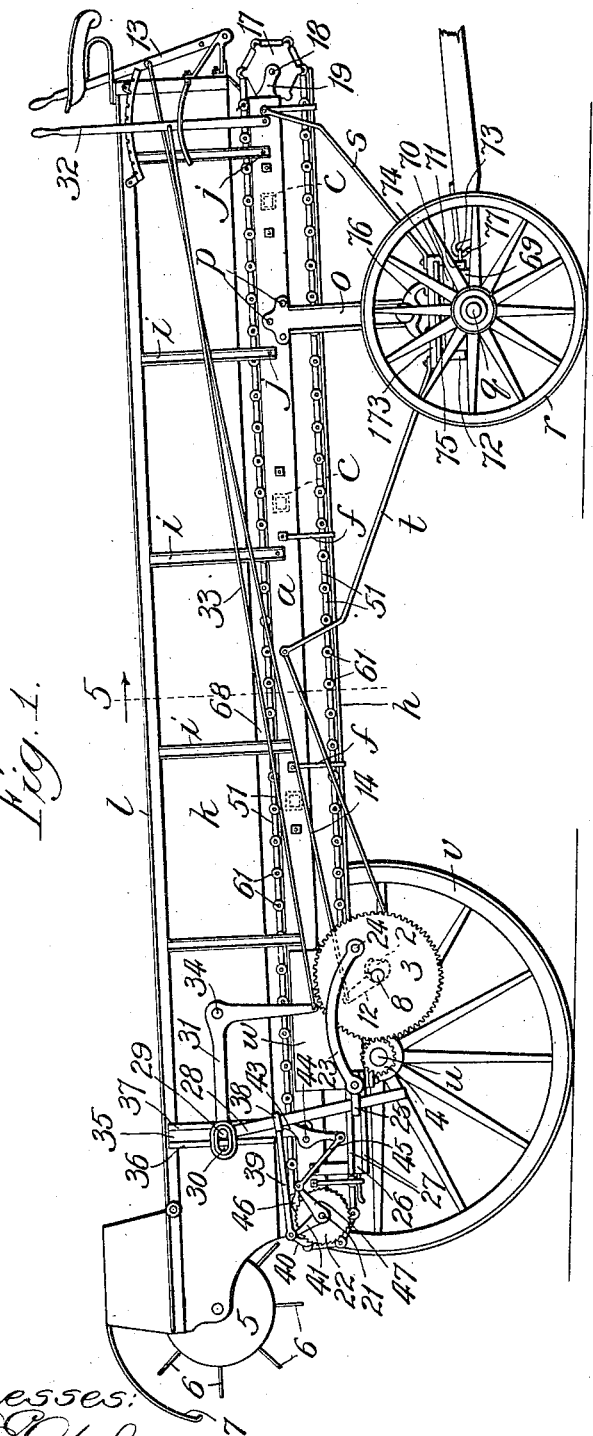
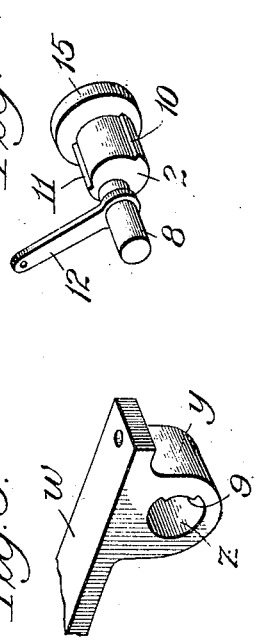
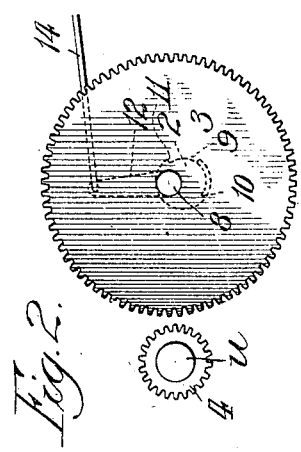

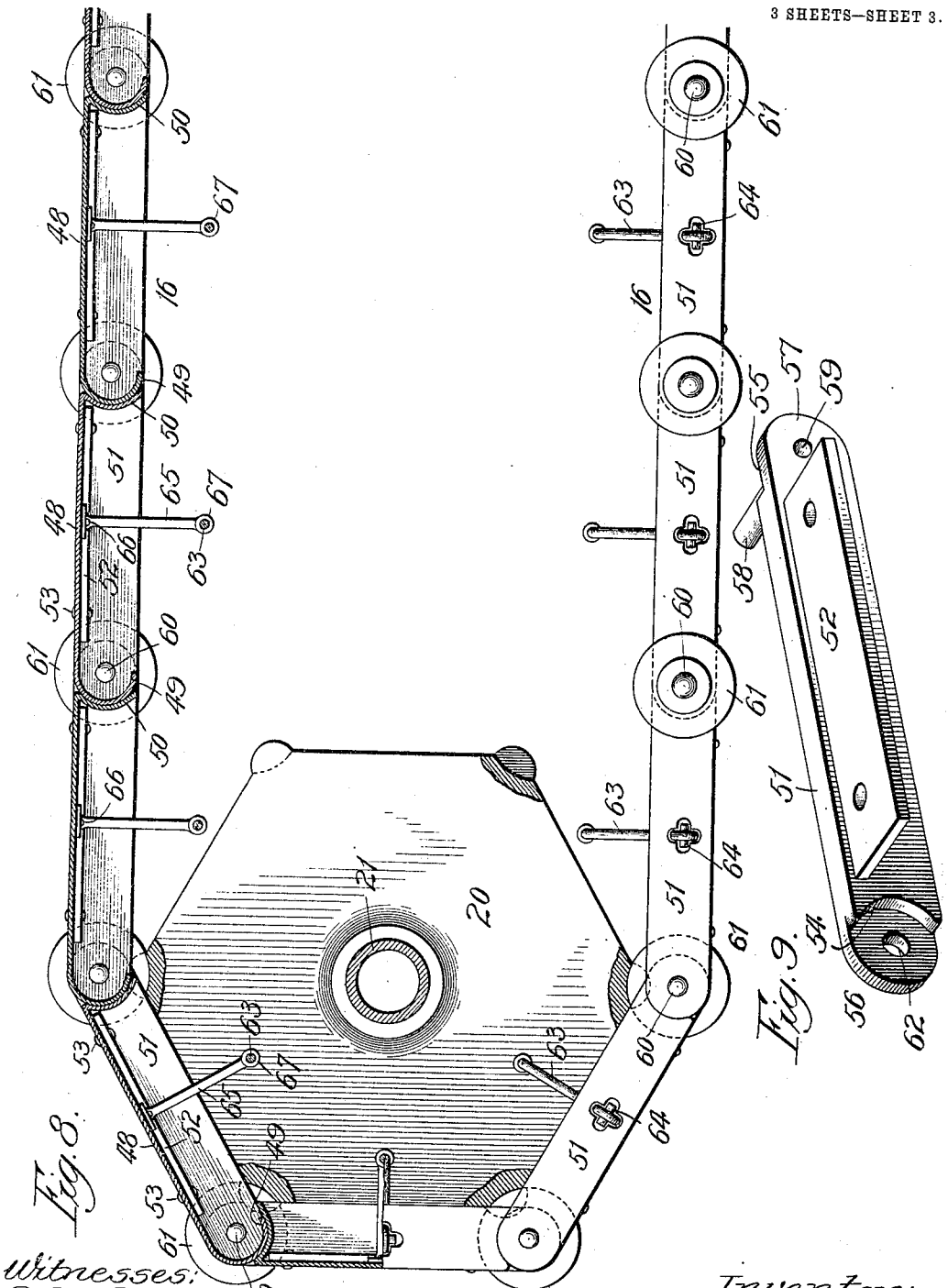

UNITED STATES PATENT OFFICE.

JOHN H. JESSEN, OF RENSSELAER, INDIANA.

FERTILIZER-SPREADER.

No. 825,654.  Specification of Letters Patent.  Patented July 10, 1906.

Application filed April 24, 1905. Serial No. 257,203.

*To all whom it may concern:*

Be it known that I, JOHN H. JESSEN, a citizen of the United States, residing in Rensselaer, county of Jasper, and State of Indiana, am the inventor of certain new and useful Improvements in Fertilizer-Spreaders, of which the following is a specification.

My invention relates to that class of fertilizer-spreaders having an endless apron for carrying the fertilizer, means for operating such apron, and a box or receptacle, the bottom of which is formed by the movable apron and the frame portion of which is provided with tracks for supporting the apron.

The principal object of the invention is to provide a simple, economical, and efficient fertilizer-spreader.

Further objects of the invention are to provide a fertilizer-spreader with a light, strong, and efficient endless apron, means for operating such apron during the movement of the vehicle when desired and permitting it to remain stationary with relation to the box or receptacle when desired, means for driving and changing the speed of movement of such endless apron while the machine is in operation, a rigid bottom framework forming tracks for supporting the apron and connected with the side plates or side boards, so as to form a strong and rigid box, and suitable means for connecting such box and apron operating mechanisms operatively with the supporting-wheels.

Other and further objects of the invention will appear from an examination of the drawings and the following description and claims.

The invention consists in the features, combinations, and details of construction hereinafter described and claimed.

In the accompanying drawings, Figure 1 is a side elevation of a fertilizer-spreader constructed in accordance with my improvements with one of the rear supporting-wheels removed; Fig. 2, a detail view in elevation of the spur-gear mechanism for driving or operating the apron; Fig. 3, a detail perspective view of a portion of a bracket for supporting the large gear-wheel shown in Fig. 2; Fig. 4, a detail perspective view of the shaft and lever mechanism for supporting and throwing the large gear-wheel shown in Fig. 2 into and out of engagement with the driving-pinion, which is connected with the axle of the rear supporting-wheels; Fig. 5, a central transverse sectional elevation taken on line 5 of Fig. 1 looking in the direction of the arrow, showing the bottom framework with its track for supporting the upper lap of the apron, the apron antifriction-wheels being outside of the side plates or side boards and showing the tracks for supporting the lower lap of the apron and the trussed metallic slats of which the apron is formed; Fig. 6, an enlarged detail view, partly in section, showing the end casting of one of the slats and the manner of connecting the metallic slats thereto; Fig. 7, a detail sectional plan view of the mechanism shown in Fig. 6, taken on line 7 of said figure looking in the direction of the arrow; Fig. 8, an enlarged detail view of my improved apron, the lower portion being in side elevation and the upper portion being a longitudinal sectional view in elevation, taken through the center of a portion of the apron; and Fig. 9, a detail perspective view of one of the metallic end castings or links for supporting and connecting the slats of the apron and its antifriction-wheels.

In the art to which this invention relates it is very desirable to provide an endless apron adapted to support the fertilizer to be carried and distributed thereby and to provide means whereby the antifriction apron-wheels may be outside of the side boards or side plates of the box, so that they will not be interfered with by the contents of the spreader. It is also desirable to provide an apron formed of slats, preferably metallic slats, which are as light as possible consistent with the stresses to which they are subjected in use and sufficiently strong to support the load without being materially deflected or bent downward thereby. My improved spreader is provided with means whereby the lower lap of the endless apron will be supported upon suitable tracks by means of the same apron rollers or wheels which support such apron upon the load-supporting tracks and to provide end castings or links for the slats so connected with the slats and with the apron wheels or rollers as to minimize the transverse play of the apron and enable the slats to form a tight bottom, while at the same time enabling the apron to be sufficiently flexible vertically to readily pass around the end sprockets or supports. I provide means for driving the apron, such apron-driving mechanism being connected operatively with the axle of the supporting-wheels and provided with means for changing the speed of movement of the apron and for stopping its movement when desired while the machine is in operation.

It is desirable to properly brace the bed or framework and to make such framework and supporting-tracks as rigid and as light as possible. The front axle should be provided with fifth-wheel mechanism which will permit its opposite ends to move vertically in opposite directions without distorting or materially affecting the position of the main frame of the vehicle or interfering with the turning of the vehicle. The tongue should be connected with the vehicle above the axle, so that the pulling strains will be communicated directly to the framework, relieving the axle of such pulling strains to as great an extent as possible.

In constructing a fertilizer-spreader in accordance with my improvements and adapted to accomplish the above objects I provide a box or bed having a bottom frame consisting of metallic longitudinal side sills a, formed, preferably, of angle-irons, having integral upper inwardly-extending flange portions b, adapted to form tracks for supporting the upper lap of the traveling apron hereinafter described. These longitudinal side sill members or tracks are connected at suitable intervals by means of a plurality of transverse bottom frame members c, formed, preferably, of metal. For this purpose I employ sections of square pipe of the desired size secured to the longitudinal side sills or tracks by means of suitable metallic flanged socket-castings d at each end thereof, having openings or sockets therein for receiving the ends of the square pipe-sections, such castings being secured to the metallic side sills or rails by means of suitable bolts e, which also extend, preferably, through depending stays or brackets f, having inwardly-extending flanges g for supporting bottom tracks h, upon which the lower lap of the apron 16 is mounted, as shown in Fig. 5.

Flanged side stakes i, preferably of metal, in the form of channels are secured by means of bolts j or in any ordinary and well-known manner to the longitudinal side sills or tracks a, and side plates k, preferably of sheet metal, are secured to the inner sides of such side stakes by means of rivets in any ordinary and well-known manner, suitable top side members or rails l being formed, preferably, of angle-irons, which extend longitudinally of the bed from end to end thereof and together with the side sills and side plates form plate-girders.

A suitable end plate m, preferably of sheet metal, extends across the front end of the box and is provided with a top angle-iron reenforcing member n, extending from side to side of the box. The front end is open at its lower portion for admitting the endless apron. A metallic depending bracket or front bolster o is secured at each side of the bed, preferably to the side sills a, by means of bolts or rivets p and mounted over the front axle q and front supporting-wheels r, being firmly braced by upwardly-inclined braces s and t, the lower ends of which are connected directly or indirectly with the front bolster or supporting-bracket and the upper ends of which are connected with the side sills.

The rear portion of the framework or box above described is mounted upon a rotatable rear axle u, having rear supporting-wheels v mounted at each end thereof and in fixed relation thereto. For this purpose a pair of rear supporting side plates or depending brackets w are provided and secured to opposite sides of the bed or framework, preferably to the side sills, so as to form a part of the framework. These rear supporting-plates are provided with journal-bearings in which the rear axle is rotatably mounted and are also provided with depending bracket portions y, each having a perforation z therethrough for receiving a shaft 2, which supports a spur gear-wheel 3 in operative engagement with a driving spur-pinion 4, which is mounted upon the rear rotatable axle and in fixed relation thereto. This gear mechanism is for the purpose of driving the endless apron, and thereby gradually conveying the contents of the box or vehicle to the rear end thereof, to be there pulverized and spread by means of a rotatable beater 5, having teeth 6, which rotate adjacent to the rear end of the apron, being driven in any ordinary or known manner.

In order to enable the apron to be driven in a step-by-step manner and permit it to remain stationary when desired, the driven spur-wheel 3, meshing with the main driving pinion 4, is rotatably mounted upon a projecting eccentric shaft portion 8 of the shaft 2 already described, as shown in Figs. 1 and 4. The depending bearing portion y of the member which supports the shaft 2 is provided with an inwardly-extending shoulder portion 9, adapted to engage shoulders 10 and 11, respectively, of such shaft, so as to stop the rotation thereof at the desired points, and a lever-arm 12 is mounted upon the shaft, preferably upon the eccentric portion thereof, and connected with an operating-lever 13 at the front end of the vehicle by means of a connecting-rod 14. The movement of the main operating-lever 13 to the position shown in Fig. 1 will throw the spur-wheel 3 into gear or into position to mesh with the main driving-pinion 4. The movement of the main operating-lever to the right from the position shown in Fig. 1 will move the lever 12 to the position shown in Fig. 2, so that the gear-wheel will be out of engagement with the driving-pinion.

The stub-shaft 2 is provided with an enlarged inner end or head portion 15, which holds it in place in the supporting bearing or bracket, suitable means, which may be of any ordinary well-known type, being provided for retaining the spur-wheel 3 rotatably in position upon the shaft.

The endless apron 16, herein elsewhere more particularly described, is mounted upon rear supporting-sprockets 17, which are supported upon shafts 18 in fixed relation to such sprockets, such shafts being rotatably mounted in brackets 19 upon the main frame. The rear portion of the endless apron is mounted upon similar sprockets 20, supported upon a shaft 21 in fixed relation to such shaft, and a ratchet-wheel 22 is mounted upon the shaft 21 in fixed relation thereto for rotating such shaft with its sprocket, and thereby driving the endless apron. In order to operatively connect such ratchet-wheel and the endless apron with the main driving pinion or gear already described, the gear-wheel 3 is provided with a pitman-rod 23, pivotally mounted upon an eccentric stud or crank 24, which projects from the side surface of such gear-wheel. This pitman-rod is pivotally connected with a box 25, which is slidably mounted in a guide 26 between upper and lower flange or guard portions 27, and an upright vibrating lever 28 extends slidably through a perforation in such sliding block, having its upper end pivotally mounted, by means of a pivot or stud 29, in a vertical guide 35 and in an elongated perforation 30 of an adjacent bell-crank lever 31, which is connected to an operating-lever 32 by means of a connecting-rod 33. This bell-crank lever is pivotally mounted upon the side frame of the vehicle by means of a pivot 34.

The pivot portion 29 of the upper end of the vibrating lever 28 already described is slidably mounted in a vertical guide 35 between vertical flange or guard portions 36 and 37. A sliding block 38, provided with a perforation therethrough for loosely receiving the vibrating lever 28, is mounted upon such vibrating lever in slidable relation thereto, and a lever or connecting-pawl-operating rod 39 has one end connected with this sliding block 38 and the other end provided with a pawl 40 in engagement with the ratchet 22 already described, such lever or rod 39 being pivotally connected with a link 41, which is rotatably mounted upon the shaft 21, which supports the ratchet-wheel.

A two-arm lever 43 is pivotally mounted upon a pivot 44 and has its upper arm pivotally connected with the perforated block 38 already described and its lower arm pivotally connected with a lever or connecting pawl-operating rod 45, having a pawl 46 in engagement with the ratchet-wheel 22, such pawl-operating rod being pivotally connected with a link 47 upon the shaft which supports such ratchet-wheel.

By this arrangement it will be seen that the rotation of the driving spur-pinion upon the rear axle will cause the rotation of the spur-wheel 3 in the opposite direction. The parts being in the position shown in Fig. 1, the pitman 23 will move the vibrating lever 28 backward, causing the pawl 40 to rotate the ratchet-wheel and drive the endless apron one step. The return stroke of the pitman will move the bottom end of the vibrating lever 28 forward and drive the rod 45, with its pawl 46, backward, thus rotating the ratchet-wheel in the same direction as before, while the pawl 40 is being moved in the opposite direction to initial position by means of the upper arm of the lever 43. A step-by-step motion is thus imparted to the endless apron. To regulate the length of each step of such movement, it is only necessary to raise or lower the vibrating lever 28. When the pivotal point of this vibrating lever is raised to its highest position, the movement of the sliding box 38 and apron will be greatest, and the lowering of the pivotal point 29 by the operation of the bell-crank lever 31 will reduce the distance traversed by the sliding box 38 at each step, thus reducing the distance traversed by the endless apron at each step. This reduction of the movement of the vibrating lever 28 at the point where it passes through the sliding blocks 38 may be carried to such a point that there will not be sufficient movement of the pawls 40 and 46 to operate the ratchet-wheel, for the reason that the pivotal point 29 will be lowered almost to the level of the sliding block. When the vibrating lever is at its lowest point, the rotation of the gearing may be continued indefinitely, if desired, without causing any movement of the apron, and by raising the pivotal point of this vibrating lever the speed of the apron may be gradually increased. It will thus be seen that the movement of the apron may be entirely stopped, either by means of the operating-lever 13 or by means of the operating-lever 32, the latter being employed for throwing the driving mechanism out of gear and the former for gradually increasing or decreasing the speed of or stopping the movement of the apron.

My improved apron is made, preferably, entirely of metal consisting of metal slats 48, each having an upper web portion provided with curved depending side flanges 49 and 50 on each side thereof, the side flanges on one side being concave and on the other side convex, so that the concave flange of each slat engages the adjacent convex flange of the next adjacent slat throughout the entire length of the apron and from end to end of the slats, forming a tight bottom portion for the vehicle. The extreme bottom edge of the concave flange of each slat should be at a sufficient distance from the adjacent convex flange to provide the necessary flexibility to the apron and permit it to pass readily around the sprocket-wheels which support it. The opposite ends of each slat are provided with an end casting 51, having an inwardly-extending flange 52, which extends under and supports the upper web portion of the slat, which is attached thereto by means of bolts 53. These end castings form links, which are pivotally connected to each other, as shown in Figs. 7 and 8. Each casting or link is provided with a recess 54 on its inner side and a similar recess 55 on its outer side at opposite ends of such castings and with circular projecting end portions 56 and 57 on its inner and outer sides, respectively, at opposite ends of the casting adapted to enter the recess of the next adjacent casting or link. The projecting end 57 of each casting or link is provided with a preferably integral lateral pivot or stud 58, having a perforation 59 therein, which extends transversely through the link for receiving a pin 60. Each of these perforated studs forms a trunnion for an apron-supporting wheel or antifriction-roller 61. The opposite projecting end portion 56 of each casting is provided with a perforation 62, through which extends the perforated pivot or stud 58 of the next adjacent casting or link, a pin or trunnion 60, with its wheel 61, being secured to such perforated stud in the manner already described. Each of the metal slats is provided with a truss-rod 63, which extends from end to end thereof, the opposite ends of each of such truss-rods being secured to the end castings of such slats by means of pins 64, which extend through loops in the ends of the truss-rods formed by bending the rods, as indicated in Fig. 8, and upright struts 65 in the form of metallic castings are secured to the upper slat portion by means of pivots 66 and to the truss-rods by means of perforations 67, through which such truss-rods extend. By this arrangement it will be seen that the upper web portion of each of the metallic slats forms an upper cord and the truss-rod a lower cord of a truss and that with the struts a light, rigid, and efficient slat is thus afforded.

The antifriction-wheels or apron-wheels 61 are made of sufficient diameter so that when they are supporting the upper lap upon the main tracks they maintain the slats in movable position above the track and out of engagement therewith and when they are passing over the lower tracks with the lower lap of the apron they maintain the lower slats above and out of engagement with such lower tracks. It is very desirable that means be provided for separating these apron wheels or rollers from the contents of the box or receptacle. In order to accomplish this, the side plates or side boards, which are preferably of sheet metal, as already described, have their lower edges 68 bent so as to extend downward and inward at an incline over the apron-wheels and over the ends of the slats adjacent to and, if desired, in loose engagement with the upper surface thereof and inside the apron-wheels.

It is important that a vehicle of this character be provided with suitable means for mounting it upon the front supporting-wheels so as to permit the independent vertical play of the opposite ends of the front axle without distorting the framework or interfering with the operation of the mechanisms. In order to accomplish this, I provide an improved fifth-wheel which comprises a supporting casting or clip 69, having a concave lower portion adapted to engage the axle and secured thereto by means of bottom clips and U-bolts (not shown) and which may be of any ordinary and well-known construction. This supporting casting or clip 69 is provided with a perforation extending therethrough at right angles to the axle to which it is secured for receiving a pivot-pin in the form of an eye-bolt 73, and a supporting-plate 70, having perforated depending portions 71 and 72, is pivotally secured to such supporting casting or clip by means of the eyebolt 73, which extends through the perforations in the supporting-plate and through the perforations in the casting 69 at right angles to the front axle. A top plate 173, having a lower horizontal bearing-surface in engagement with the top horizontal bearing-surface of the pivoted supporting member 70, is rotatably mounted upon such pivoted supporting-plate and provided with depending lugs 74, normally at right angles to the axle in engagement with the periphery of the pivoted member. In other words, the front and rear lugs 74 are in alinement with the longitudinal center of the framework or box of the vehicle and remain so notwithstanding the movement of the ends of the front axle in any direction. The depending lugs 74 of the top plate of the fifth-wheel above described each have inwardly-extending shoulders in engagement with an annular recess 75 in the periphery of the pivoted member, and a king-bolt (not shown) extends vertically through the center of the top plate and the supporting-casting or horizontally-perforated member of the fifth-wheel. The top plate is connected with the framework by means of braces $s$ and $t$ already described and to the main supporting bracket or bolster by means of a connecting-bracket 76. By this arrangement it will be readily seen that the opposite ends of the front axle may move vertically in opposite directions, such movement being permitted by the horizontal pivot or eyebolt 73, which is firmly secured in place by means of a cotter-pin or any ordinary and well-known means, and that the movement of the axle in a horizontal plane is permitted by the bearing-rings or rotatably connected top and pivoted supporting members of the fifth-wheel.

The tongue is secured to the fifth-wheel by means of a hook 77, the lower end of which extends through the opening in the eyebolt and forward a sufficient distance to prevent the removal of the tongue when in raised position, but adapted to permit its removal when the front of the tongue is lowered to a level with the bottom of the supporting-wheels. Side connections may be provided in any ordinary and well-known form removably attached to the front axle, so as to enable the axle to be guided by the tongue; but such side connections need not be of sufficient weight to draw the load, as the weight of the load is substantially drawn by means of the tongue, which is directly connected with the fifth-wheel, as already described. This enables a lighter axle to be used than would otherwise be necessary, as the axle is not required to sustain the stresses incident to drawing the load.

I claim—

1. In a fertilizer-spreader, the combination of longitudinal metallic side sills, metallic transverse members connected with such side sills, metallic side plates extending above the side sills, top side frame members, means for connecting the top side frame members, the side plates top side frame members and side sills together forming side-plate girders, and brace-rods secured to the sides of the framework and extending downward at an incline below the side sills toward the opposite ends thereof.

2. In a fertilizer-spreader, the combination of longitudinal side sills formed of angle-irons extending longitudinally of the device and forming apron-supporting tracks, transverse bottom members connecting such longitudinal sills and forming therewith a bottom framework, metallic side plates extending above and secured to such angle-iron side sills, and brace-rods secured to the side sills and extending downward at an incline below such sills and toward the direction of the opposite ends thereof.

3. In a fertilizer-spreader, the combination of a receptacle for containing the material to be operated upon, a movable endless apron forming a movable bottom for such receptacle, side frames, vehicle-supporting wheel mechanism provided with a rotatable axle in fixed relation therewith, gear mechanism mounted upon such axle, gear mechanism movable into and out of engagement with the gear mechanism upon the axle, a sliding bearing-box, a pitman-rod connecting such sliding bearing-box with the movable gear mechanism, lever mechanism operatively connected with the apron, and a vibrating lever connecting such apron-driving lever mechanism with the sliding box for operating and changing the speed of movement of the apron.

4. In a fertilizer-spreader, the combination of a receptacle for containing the material to be operated upon, a movable endless apron forming a movable bottom for such receptacle, side frames, vehicle-supporting wheels, mechanism provided with a rotatable axle in fixed relation therewith, gear mechanism mounted upon such axle, gear mechanism movable into and out of engagement with the gear mechanism upon the axle, a sliding bearing-box, a pitman-rod connecting such sliding bearing-box with the movable gear mechanism, lever mechanism operatively connected with the apron, a vibrating lever connecting such apron-driving lever mechanism with the sliding box for operating and changing the speed of movement of the apron, and means for adjusting such vibrating lever.

5. In a fertilizer-spreader, the combination of a receptacle for containing the material to be operated upon, a movable apron forming a movable bottom for such receptacle, side frames, vehicle-supporting wheel mechanism provided with a rotatable axle in fixed relation therewith, gear mechanism mounted upon such axle, gear mechanism movable into and out of engagement with the gear mechanism upon the axle, a sliding bearing-box, a pitman-rod connecting such sliding bearing-box with the movable gear mechanism, lever mechanism operatively connected with the apron, a vibrating lever connecting such apron-driving lever mechanism with the sliding box for operating and changing the speed of movement of the apron, means for adjusting such vibrating lever, and means for throwing the gear mechanism into and out of operative position.

6. In a fertilizer-spreader, an apron having a multiplicity of slats flexibly secured together each formed of an upper metallic compression member, a lower metallic tension member, and intermediate strut portions between such upper and lower members.

7. In a fertilizer-spreader, an apron having a multiplicity of slats flexibly secured together each formed of an upper metallic compression member, a lower metallic tension member, intermediate strut portions between such upper and lower members, and apron-supporting wheels rotatably mounted at opposite ends of each of such slats and movable therewith.

8. In a fertilizer-spreader, an apron having a multiplicity of metallic slats each provided with curved depending flanges, metallic end members connected with such flanged slat members pivotally connected together and each provided with a trunnion, and apron-supporting wheels rotatably mounted upon such trunnions.

9. In a fertilizer-spreader, an apron having metallic slats extending transversely thereof each formed of an upper metallic compression member having depending flanges, a lower suspension member, intermediate struts connecting such compression and suspension members, and means for pivotally connecting such slats.

10. In a fertilizer-spreader, an apron having metallic slats each provided with curved depending flange portions on the opposite sides thereof, end castings secured to the opposite ends of each of such slats each provided with a trunnion at one end and a perforation at its other end for receiving the trunnion of the next adjacent end casting, and apron-supporting wheels rotatably mounted upon each of such trunnions.

11. In a fertilizer-spreader, an apron having a multiplicity of slats each provided with depending side flanges, end castings secured to opposite ends of each of such slats forming links for flexibly connecting and supporting the slats each of such links having a flange secured to the slat and being provided with a pivoted trunnion at one end thereof and a perforation at the opposite end for receiving the trunnion of the next adjacent casting or link, apron-supporting wheels rotatably mounted upon such trunnions, and headed pins extending through the perforated trunnions for holding such apron-supporting wheels in place.

12. In a fertilizer-spreader, an apron having a multiplicity of metallic slats each provided with an integral depending flange portion having an outwardly-curved surface on one side thereof, an integral depending flange portion having an inwardly-curved surface on the opposite side of such slat such flanges of each slat being adapted to engage the adjacent flanges of the next adjacent slat, and means for flexibly connecting such slats.

13. In a fertilizer-spreader, an apron having a multiplicity of metallic slats each provided with an integral depending flange portion having an outwardly-curved surface on one side thereof, an integral depending flange portion having an inwardly-curved surface on the opposite side of such slat such flanges of each slat being adapted to engage the adjacent flanges of the next adjacent slat, end castings for each of such slats provided with trunnions, and apron-supporting wheels rotatably mounted upon such trunnions of greater diameter than the thickness of such end castings and having peripheral portions extending above and below such castings for supporting the apron-slats in both inverted and upright positions.

14. In a fertilizer-spreader, an apron having a multiplicity of slats each provided with an outwardly-curved side surface on one side thereof and inwardly-curved surface on the opposite side thereof each of such side surfaces being adapted to engage adjacent slats, and means for flexibly connecting such slats.

15. In a fertilizer-spreader, an apron having a multiplicity of slats each provided with an outwardly-curved side surface on one side thereof and inwardly-curved surface on the opposite side thereof each of such side surfaces being adapted to engage adjacent slats, end castings secured to each end of each of such slats and pivotally connected together, and supporting-wheels pivotally secured to such end castings and movable therewith.

JOHN H. JESSEN.

Witnesses:
 HARRY I. CROMER,
 NORMAN A. STREET.